United States Patent
Seidel et al.

(10) Patent No.: US 7,410,344 B2
(45) Date of Patent: Aug. 12, 2008

(54) RAM AIR TURBINE CENTRIFUGAL BRAKE

(75) Inventors: William E. Seidel, Rockford, IL (US); David N. Chapman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 573 days.

(21) Appl. No.: 11/130,375

(22) Filed: May 16, 2005

(65) Prior Publication Data
US 2006/0257247 A1 Nov. 16, 2006

(51) Int. Cl.
*F01D 7/02* (2006.01)

(52) U.S. Cl. ............................ 416/53; 416/49; 416/152; 416/169 R

(58) Field of Classification Search .................. 416/44, 416/49, 53, 137, 152, 169 R
See application file for complete search history.

(56) References Cited

U.S. PATENT DOCUMENTS

| 1,316,466 | A | * | 6/1919 | Taubert | .................. | 192/104 R |
| 4,062,433 | A | * | 12/1977 | St. John | .................. | 192/104 R |
| 4,701,104 | A | * | 10/1987 | Cohen | .......................... | 416/44 |
| 4,743,163 | A |   | 5/1988 | Markunas et al. | | |

* cited by examiner

*Primary Examiner*—Edward K. Look
*Assistant Examiner*—Devin Hanan
(74) *Attorney, Agent, or Firm*—Stephen G. Mican

(57) ABSTRACT

A brake system for a ram air turbine (RAT) causes the RAT to slow or lock if the RAT achieves an over-speed condition with a centrifugal force operated trigger system that actuates a compression type brake pack to slow or lock the turbine hub.

14 Claims, 2 Drawing Sheets

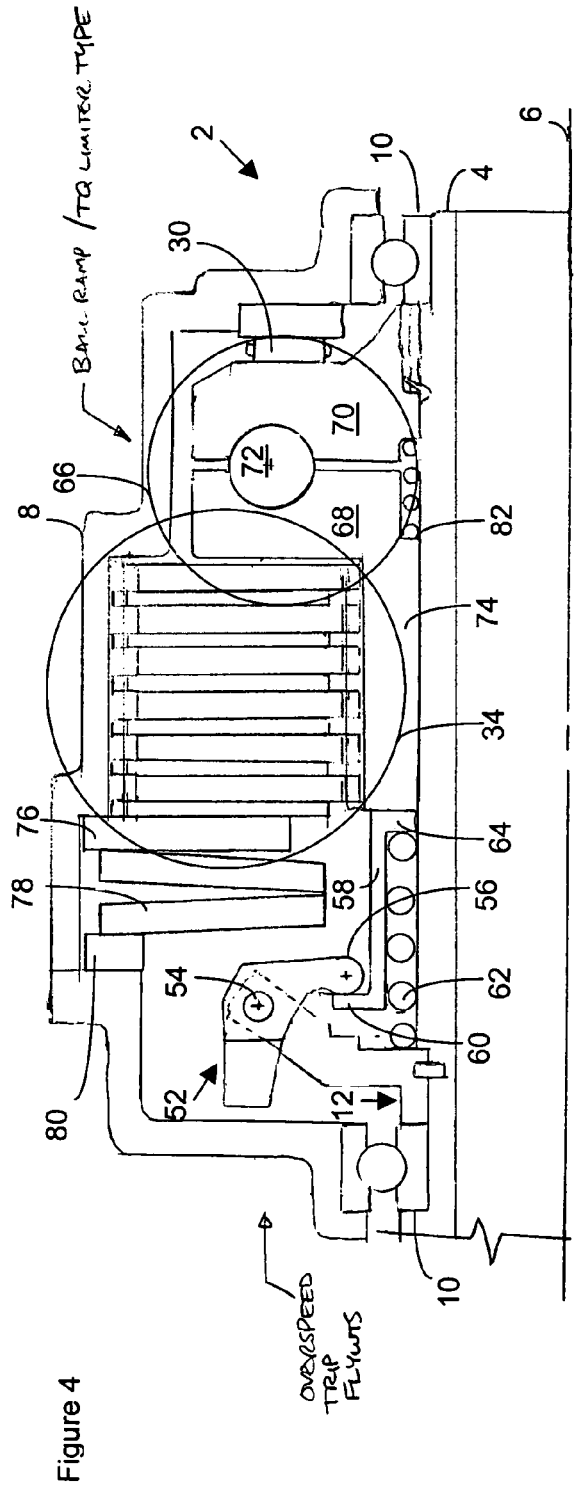
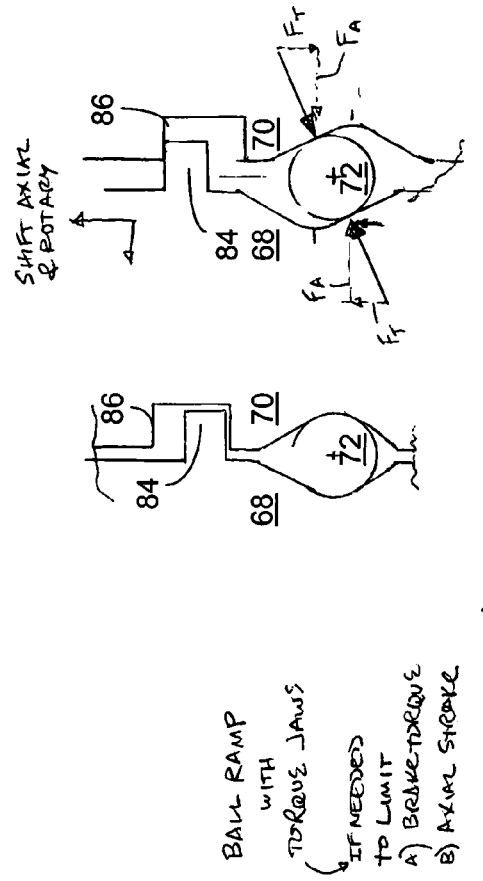
Figure 4
Figure 5
Figure 6

RAM AIR TURBINE CENTRIFUGAL BRAKE

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power, or both in the case of a hybrid RAT.

As described in Markunas et al., the turbine includes a speed governor that changes the turbine blade position to maintain a relatively constant shaft speed to the power generating equipment. Failure of the turbine speed governor can cause an over-speed condition that may ultimately cause the release of a turbine blade at very high speed. Due to the high speed, the wayward blade has very high energy as well. The most common cause of governor failure is due to seizure of the bearing between the turbine shaft and the governor yoke plate that controls the pitch of the turbine blades.

The potential release of a high-energy blade proximate the aircraft is a concern for both commercial and military RAT applications. Should the wayward blade strike the aircraft fuselage, it may penetrate the skin and cause damage to electric or hydraulic power equipment or control systems. It may also injure passengers or crew. If one of the propulsion engines ingests the wayward blade, the engine may suffer severe damage that results in loss of thrust.

Current methods to minimise hazards caused by turbine over-speed-induced release of a turbine blade have involved strategic placement of key elements or shields to prevent penetration. These methods no longer satisfy increasingly stringent certification and safety requirements promoted by airworthiness authorities.

SUMMARY OF THE INVENTION

The invention comprises a RAT brake system that causes the turbine hub to slow or lock if the RAT achieves an over-speed condition. A centrifugal force operated trigger system actuates a compression type brake pack to slow or lock the turbine hub. One embodiment of the invention has a manually resetable trigger system. Another embodiment of the invention has an automatically resetable trigger system.

The preferred embodiments of the invention comprise an over-speed brake system for a ram air turbine (RAT) comprising: a compressive brake pack that acts between a stationary hub and a drive shaft coupled to the RAT; and a centrifugally operated trigger system that compresses the compressive brake pack when it senses that the RAT exceeds its normal operating speed. One embodiment comprises a centrifugal flyweight assembly that activates a ball ramp assembly to release a compression assembly that compresses the compressive brake pack. Another embodiment comprises a centrifugal flyweight assembly that activates a ball ramp assembly to directly compress the compressive brake pack.

DESCRIPTION OF THE DRAWINGS

FIG. 4 is a cut-away sectional side view of a second embodiment of the invention with an automatically resetable trigger mechanism.

FIG. 5 is a partial cut-away view of a first ball ramp and a second ball ramp for the second embodiment that shows the position of a ball between the ramps when the RAT is operating at normal speed or less.

FIG. 6 is a partial cut-away view of a first ball ramp and a second ball ramp for the second embodiment that shows the position of a ball between the ramps when the RAT is operating at a speed that exceeds normal speed.

DETAILED DESCRIPTION OF THE INVENTION

Figure 1:
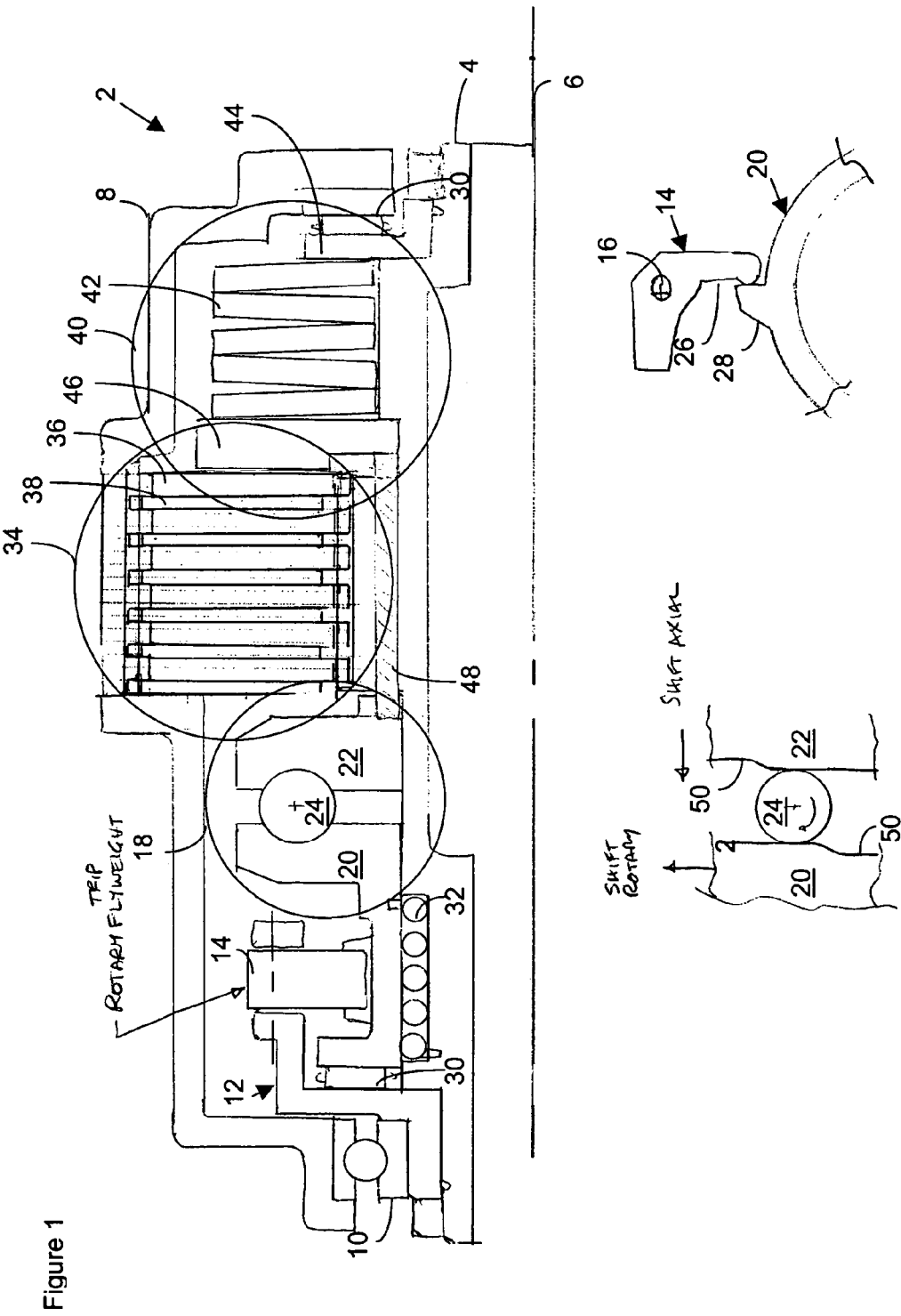
FIG. 1 is a cut-away sectional side view of a first embodiment of the invention with a manually resetable trigger system.

FIG. 1 is a cut-away sectional side view of a first embodiment of a RAT over-speed brake system 2. The brake system 2 has a drive shaft 4 with an axis of rotation 6. The drive shaft 4 is conveniently a turbine shaft of a RAT, but it may also be an independent shaft coupled directly or indirectly to a RAT turbine shaft. The brake system 2 also has a stationary housing 8. The housing 8 is conveniently a stationary housing of a RAT, but it may also be an independent stationary housing. The housing 8 rotatably retains the shaft 4 with a plurality of bearing assemblies 10.

Figure 2:
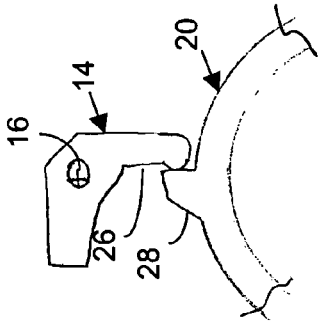
FIG. 2 is an end view of a flyweight assembly and a portion of a first ball ramp for the first embodiment that shows the engagement of a flyweight drive tang and a first ball ramp drive tang.

The shaft 4 retains at least one flyweight assembly 12 that has a rotary flyweight 14. As shown in FIG. 2, a flyweight shaft 16 that is parallel to the drive shaft 4 rotatably retains the rotary flyweight 14 to allow the rotary flyweight 14 to rotate radially with respect to the drive shaft axis 6. The shaft 4 also rotatably retains a ball ramp assembly 18 that comprises a first ball ramp 20 that couples to a second ball ramp 22 by way of a plurality of balls 24.

A flyweight drive tang 26 on the rotary flyweight 14 engages a complementary ball ramp drive tang 28 on the first ramp 20. A plurality of bearings 30, such as roller bearings, allows the first ramp 20 to rotate about the drive shaft axis 6 relative to the flyweight assembly 12. Centrifugal force of the flyweight 14 applies a force on the first ramp 20 that tends to rotate the first ramp 20 about the drive shaft axis 6. A torsion spring 32 connecting the drive shaft 4 to the first ball ramp 20 provides a preload bias force on the rotary flyweight 14 by way of the ball ramp drive tang 28 and the flyweight drive tang 26. This bias force counteracts the force of the flyweight 14 on the first ball ramp 20 so that it remains stationary with respect to the drive shaft 4 up to the normal operating speed of the RAT.

The brake system 2 also comprises a compressive brake pack 34. The compressive brake pack 34 has a plurality of stationary plates 36 fastened to the stationary housing 8 and a series of rotating plates 38 fastened to the drive shaft 4 with an axial freedom of movement and with suitable friction surfaces or elements between the stationary plates 36 and the rotating plates 38 such that compression of the brake pack 34 causes motion of the drive shaft 4 to cease. A brake compression assembly 40 provides a compression force against the compressive brake pack 34 for this purpose when the speed of the drive shaft 4 exceeds the normal operating speed of the RAT.

The compression assembly 40 comprises a compression spring 42 mounted between a spring retainer 44 fastened to the drive shaft 4 and a pressure plate 46 fastened to the drive shaft 4 with an axial freedom of movement that contacts one end of the brake pack 34. A plurality of bearings 30, such as roller bearings, allows the spring retainer 44 to rotatably contact the stationary housing 8. The other end of the brake pack 34 butts up against a portion of the stationary housing 8. At least one pin 48 mounted between the pressure plate 40 and the second ball ramp has sufficient length to keep the brake pack 34 in a relaxed state when the drive shaft 4 remains at or below the normal operating speed of the RAT. The compression spring 42 may conveniently comprise a Belleville disc stack as shown, a helical compression spring, or any other such compressive device that may be mounted between the spring retainer 44 and the pressure plate 46.

Figure 3:
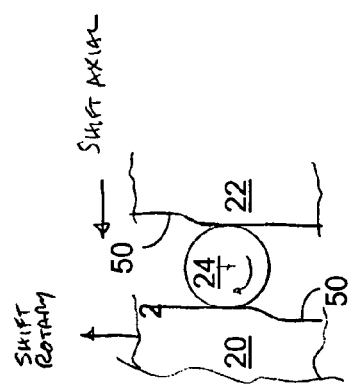
FIG. 3 is a partial cut-away side view of a first ball ramp and a second ball ramp for the first embodiment that shows pockets for a ball between the ramps.

The flyweight assembly 12 and ball ramp assembly 18 combination serve as a centrifugal force operated trigger system that activates the brake pack 34 to stop the drive shaft 4 when the RAT exceeds normal operating speed. When the RAT starts to exceed normal speed, the centrifugal force exerted by the rotary flyweight 14 transmitted to the first ball ramp 20 through the drive tangs 26 and 28 starts to exceed the opposing preload force of the torsion spring 32 exerted on the first ball ramp 20. As shown in FIG. 3, this causes the first ball ramp 20 to rotate relative to the drive shaft 4, thereby causing the balls 24 between the first ball ramp 20 and the second ball ramp 22 in the ball ramp assembly 18 to fall into ramp pockets 50. As a result, ball ramp assembly allows the brake compression assembly 40 to shift the pin 48 toward the ball ramp assembly 18 to take up the clearance between the first ball ramp 20 and the second ball ramp 22. At the same time, the pressure plate 46 exerts a compressive force on the brake pack 34, thereby causing the drive shaft 4 to stop.

The brake system 2 according to this embodiment keeps the drive shaft 4 locked until manually reset. Resetting the brake system 2 involves rotating the first ball ramp 20 relative to the second ball ramp 22 so that the balls 24 move out of the ramp pockets 50 to their normal position. The second ball ramp 22 then shifts the pin 48 to relieve the compression of the brake pack 34 by the compression assembly 40.

FIG. 4 is a cut-away sectional side view of a second embodiment of a RAT over-speed brake system 2 that automatically resets the centrifugal force operated trigger system. In this case, each flyweight assembly 12 has a rotary flyweight 52. A flyweight shaft 54 that is perpendicular to the drive shaft 4 rotatably retains the rotary flyweight 52 to allow the rotary flyweight to rotate perpendicularly to the drive shaft axis 6. A flyweight drive tang 56 engages a collar 58 by way of a collar drive tang or lip 60. The collar 58 mounts about the drive shaft 4 such that rotary motion of the flyweight 52 causes axial motion of the collar 58 along the drive shaft 4. An axial compression spring 62, such as a helical compression spring, mounted between the flyweight assembly 12 and a lip 64 of the collar 58, provides a preload bias force that tends to displace the collar 58 away from the flyweight assembly 12.

The drive shaft 4 rotatably retains a ball ramp assembly 66 that comprises a first ball ramp 68 coupled to a second ball ramp 70 by way of a plurality of balls 72. In this embodiment, the compressive brake pack 34 is mounted between the stationary housing 8 and a sleeve 74 of the first ball ramp 68 that extends along the drive shaft 4 to contact the lip 64 of the collar 58. One side engages a pressure plate 76. An axial compression spring 78, such as a Belleville disk stack as shown or a helical compression spring, applies a preload force against the pressure plate 76 that keeps the pressure plate butted up against a lip 80 in the stationary housing 8.

A small axial compression spring 82 mounted about the drive shaft 4 between the first ball ramp 68 and the second ball ramp 70 pushes the first ball ramp 68 toward the brake pack 34 and the second ball ramp 70 toward the stationary housing 8. A plurality of bearings 30, such as roller bearings, allows the second ball ramp 70 to rotatably contact the stationary housing 8. The lip 64 on the collar 58 contacts the sleeve 74 of the first ball ramp 68 so that when the RAT is at or less than normal operating speed the first ball ramp 68 cannot compress the brake pack 34.

The flyweight assembly 12 and ball ramp assembly 68 combination serves as a centrifugal force operated trigger system that activates the brake pack 34 to stop the drive shaft 4 when the RAT exceeds normal operating speed. When the RAT starts to exceed normal speed, the centrifugal force exerted by the rotary flyweight 52 transmitted to the collar 58 through the flyweight drive tang 56 and collar drive tang 60 starts to exceed the opposing preload force of the compression spring 62 on the collar 58. This causes the lip 64 of the collar 58 to lose contact with the sleeve 74 of the first ball ramp 68.

The compression spring 82 then pushes the first ball ramp 68 toward the brake pack 34 to make contact with it, causing the first ball ramp 68 to rotate relative to the second ball ramp 70. As shown in FIGS. 5 and 6, this relative rotation causes the balls 72 to widen the gap between the first ball ramp 68 and the second ball ramp 70, thereby forcing the first ball ramp 68 into the brake pack 34 sufficiently to compress the brake pack 34 to slow the drive shaft 4.

The first ball ramp 68 has at least one drive tang 84 and the second ball ramp 70 has at least one complementary drive aperture 86. The drive tang 84 only makes contact with its complementary drive aperture to limit the relative rotation between the first ball ramp 68 and the second ball ramp 70. This helps to prevent compressing the brake pack 34 to such an extent that it over-torques the brake system 2. The purpose of the compression spring 78 is only to make sure that the compression of the brake pack 34 by the first ball ramp 68 is limited to prevent over-torquing the brake system 2.

When the RAT slows down due to the braking action of the brake system 2 to a speed at or less than normal operation, the lip 64 of the collar 58 once again pushes the first ball ramp 68 toward the second ball ramp 70. This forces the balls 72 to rotate back to their initial positions, as shown in FIG. 5, so that the first ball ramp 68 no longer compresses the brake pack 34. Thus, this embodiment of the invention automatically resets when the RAT speed falls to normal operating speed or less.

Described above is a brake system for a RAT that causes the RAT to slow or lock if the RAT achieves an over-speed condition by using a centrifugal force operated trigger system that actuates a compression type brake pack to slow or lock the turbine hub. It should be understood that the described embodiments are only illustrative implementations of the invention, that the various parts and arrangement thereof may be changed or substituted, and that the invention is only limited by the scope of the attached claims.

What is claimed is:

1. An over-speed brake system for a ram air turbine (RAT) comprising:

a compressive brake pack that acts between a stationary hub and a drive shaft coupled to the RAT; and a centrifugally operated trigger system that compresses the compression brake pack when it senses that the RAT exceeds its normal operating speed.

2. The over-speed brake system of claim 1, wherein the centrifugally operated trigger system comprises a centrifugal flyweight assembly that acts on a ball ramp assembly.

3. The over-speed brake system of claim 2, wherein the ball ramp assembly causes compression of the compressive brake pack when the centrifugal flyweight assembly senses that the RAT exceeds its normal operating speed.

4. The over-speed brake system of claim 3, wherein the centrifugal flyweight assembly comprises a rotary flyweight responsive to the speed of the RAT that overcomes a preload spring force to shift the position of balls in the ball ramp assembly to cause compression of the compressive brake pack when the RAT exceeds its normal operating speed.

5. The over-speed brake system of claim 4, wherein the ball ramp assembly releases a compression assembly to compress the compressive brake pack.

6. The over-speed brake system of claim 5, wherein the compression assembly comprises a compression spring that provides compressive force to compress the compressive brake pack.

7. The over-speed brake system of claim 4, wherein the ball ramp assembly compresses the compressive brake pack.

8. The over-speed brake system of claim 7, wherein the ball ramp assembly provides compressive force to compress the compressive brake pack.

9. The over-speed brake system of claim 7, wherein the position of the balls in the ball ramp assembly shift back to remove compression of the compressive brake pack when the RAT returns to normal speed or less.

10. An over-speed brake system for a ram air turbine (RAT) comprising:

a compressive brake pack that acts between a stationary hub and a drive shaft coupled to the RAT; and a centrifugally operated trigger system comprising a centrifugal flyweight assembly with a rotary flyweight responsive to the speed of the RAT that overcomes a preload spring force when the RAT exceeds its normal operating speed to shift balls in a ball ramp assembly that causes the release of a compression assembly that compresses the compression brake pack.

11. The over-speed brake system of claim 10, wherein the compression assembly comprises a compression spring that provides compressive force to compress the compressive brake pack.

12. An over-speed brake system for a ram air turbine (RAT) comprising:

a compressive brake pack that acts between a stationary hub and a drive shaft coupled to the RAT; and a centrifugally operated trigger system comprising a centrifugal flyweight assembly with a rotary flyweight responsive to the speed of the RAT that overcomes a preload spring force when the RAT exceeds its normal operating speed to shift balls in a ball ramp assembly that cause the ball ramp assembly to compress the compressive brake pack.

13. The over-speed brake system of claim 12, wherein the ball ramp assembly provides compressive force to compress the compressive brake pack.

14. The over-speed brake system of claim 13, wherein the position of the balls in the ball ramp assembly shift back to remove compression of the compressive brake pack when the RAT returns to normal speed or less.

* * * * *